(12) United States Patent
Malgioglio et al.

(10) Patent No.: US 10,734,615 B2
(45) Date of Patent: Aug. 4, 2020

(54) BATTERY PACK ASSEMBLY USING AN ULTRAVIOLET RESPONSIVE ADHESIVE

(71) Applicant: Apple Inc., Cupertino, CA (US)

(72) Inventors: Anthony J. Malgioglio, San Jose, CA (US); Brian Haskins, Campbell, CA (US); Yeow Thiam Ooi, Butterworth (MY); Houchao Fu, Lu'an (CN)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 15/833,266

(22) Filed: Dec. 6, 2017

(65) Prior Publication Data

US 2019/0097185 A1 Mar. 28, 2019

Related U.S. Application Data

(60) Provisional application No. 62/563,292, filed on Sep. 26, 2017.

(51) Int. Cl.
*H01M 2/02* (2006.01)
*H01M 2/10* (2006.01)

(52) U.S. Cl.
CPC .......... *H01M 2/0267* (2013.01); *H01M 2/026* (2013.01); *H01M 2/1061* (2013.01); *H01M 2/1077* (2013.01); *B32B 2307/71* (2013.01)

(58) Field of Classification Search
CPC ............... H01M 2/00; H01M 2/026
See application file for complete search history.

(56) References Cited

U.S. PATENT DOCUMENTS

| 5,741,609 | A | 4/1998 | Chen et al. |
| 6,063,521 | A | 5/2000 | Deslyper et al. |
| 2008/0241663 | A1 | 10/2008 | Yamashita et al. |
| 2012/0068551 | A1 | 3/2012 | Pooley et al. |
| 2013/0045397 | A1 | 2/2013 | Pyo |
| 2014/0130851 | A1* | 5/2014 | Osamura ................. B32B 25/18 136/251 |
| 2018/0183117 | A1 | 6/2018 | Cho et al. |
| 2019/0074552 | A1* | 3/2019 | Matsumoto ......... H01M 10/425 |

(Continued)

FOREIGN PATENT DOCUMENTS

| EP | 3091590 | 11/2016 |
| JP | 2009043442 A * | 2/2009 |
| JP | 2011-054563 | 3/2011 |

(Continued)

OTHER PUBLICATIONS

Kojima et al. JP 2009-043442A. Feb. 26, 2009. English machine translation by Google Patents. (Year: 2009).*

(Continued)

*Primary Examiner* — James Lee
(74) *Attorney, Agent, or Firm* — Polsinelli PC

(57) ABSTRACT

The disclosed technology relates to a battery pack assembly that includes multiple battery cells. In some aspects, each cell is bonded to a first surface of a first liner (e.g., a cosmetic liner) via a first adhesive. The first adhesive is configured to provide a first adhesive force between each of the battery cells and the first surface before exposure to ultraviolet (UV) light and a second adhesive force after exposure to UV light, and wherein the second adhesive force is less than the first adhesive force. A battery pallet and method of manufacturing are also provided.

17 Claims, 4 Drawing Sheets

(56) References Cited

U.S. PATENT DOCUMENTS

2019/0081291 A1   3/2019   Chien et al.

FOREIGN PATENT DOCUMENTS

| KR | 10-1699846 | 1/2017 |
| WO | WO 2016/200231 | 12/2016 |

OTHER PUBLICATIONS

Nikafshar et al., "The Effects of UV Light on the Chemical and Mechanical Properties of a Transparent Epoxy-Diamine System in the Presence of an Organic UV Absorber," *Materials*, 2017, vol. 10, No. 180, 18 pages.

\* cited by examiner

BATTERY PACK ASSEMBLY USING AN ULTRAVIOLET RESPONSIVE ADHESIVE

PRIORITY

This application claims the benefit under 35 U.S.C. § 119(e) of U.S. Provisional Patent Application Ser. No. 62/563,292, entitled "BATTERY PACK ASSEMBLY USING AN ULTRAVIOLET RESPONSIVE ADHESIVE", filed on Sep. 26, 2017, which is incorporated herein by reference in its entirety.

TECHNICAL FIELD

The present disclosure relates generally to battery packs, and more particularly, to the use of an ultraviolet responsive liner configured to facilitate battery pack transport and insertion into a battery-powered device.

BACKGROUND

Battery cells are used to provide power to a wide variety of portable electronic devices, including laptop computers, tablet computers, smart phones, personal digital assistants (PDAs), digital music players, watches, and wearable devices. A commonly used type of battery is a lithium battery that can include a lithium-ion or a lithium-polymer battery. In some applications, where greater charge storage is desired, multiple battery cells can be coupled to form battery packs of increased storage capacity.

Multi-cell battery packs are commonly placed in an interior volume of an associated battery powered device. In some arrangements, individual cells may physically separated and stored in different locations, for example, in an interior chassis of the battery-powered device.

SUMMARY

The disclosed embodiments provide a battery pack having multiple battery cells that are bonded to a first surface of a first liner via a first adhesive. The first adhesive is configured to provide a first adhesive force between each of the battery cells and the first surface before exposure to ultraviolet (UV) light, and a second adhesive force after exposure to UV light, wherein the second adhesive force is less than the first adhesive force. In some aspects, the battery pack further includes multiple pads that are bonded to a second surface of the first liner via a second adhesive, wherein the second adhesive is configured to provide a third adhesive force between each of the pads and the second surface of the first liner, and wherein the third adhesive force is less than the first adhesive force.

In some aspects, the disclosed technology provides a battery pallet that includes multiple of battery packs. Each of the battery packs include multiple battery cells that are bonded to a first surface of a first liner via a first adhesive. The first adhesive can be configured to provide a first adhesive force between each of the battery cells and the first surface before exposure of the first surface to ultraviolet (UV) light and a second adhesive force after exposure to UV light.

In yet another aspect, the disclosed technology provides a method of manufacturing a battery pack. The method can include steps for bonding multiple battery cells to a first surface of a first liner using a first adhesive, and wherein the first adhesive provides a first adhesive force between each of the battery cells and the first surface before exposure to ultraviolet (UV) light, and a second adhesive force after exposure to UV light.

BRIEF DESCRIPTION OF THE DRAWINGS

The embodiments disclosed herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
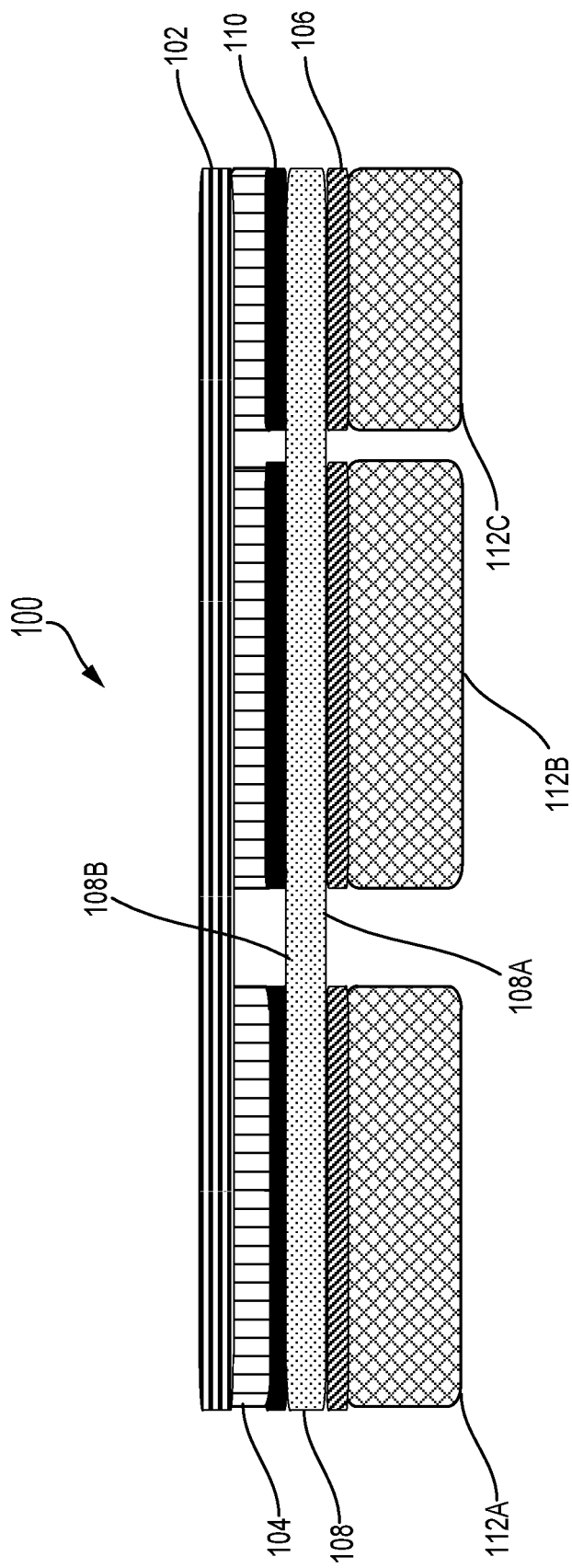
FIG. 1 illustrates a side view of an example battery pack, according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the technology.

Battery-powered electronic devices can contain battery packs made up of multiple, electrically coupled, battery cells. In some configurations, space and/or layout constraints can be alleviated by placement of the cells at disjoint locations in the device chassis. In some approaches, battery cells are bonded to an interior surface of the chassis at different locations in battery bays, which are configured to accommodate cells of a particular dimension. Depending on the device assembly, battery bays can be irregularly spaced and/or configured to hold cells of different dimensions.

The irregularity of bay placement and cell dimensions can complicate the process of battery pack insertion into the chassis. For example, to maintain a tight fit, care must be taken to ensure that the correct cells are placed within the correct bays. The insertion process can be further complicated where adhesive bonding between the cells and chasses occurs upon insertion of a particular cell into a corresponding battery bay, making cell removal and re-insertion (e.g., to fix incorrect placements) more difficult.

Aspects of the technology address the foregoing problems by providing battery packs in which the cells are bonded to a set of liners at pre-configured spacing intervals, which correspond with spacing intervals of corresponding battery bays in a receiving chassis. Such arrangements facilitate the transportation and insertion of cells into a device at proper bay spacing intervals. In some aspects, the battery pack can include liners that are configured for convenient removal after battery pack insertion is complete.

In some battery pack assemblies of the disclosed technology, each battery cell is bonded to a first liner (e.g., a cosmetic liner), using a first adhesive that is reactive to light in the ultraviolent range, i.e., a UV adhesive or UV reactive adhesive. The first liner is, in turn, bonded to a set of pads coupled with a second liner (e.g., a carrier liner) using a second adhesive of a weaker bond strength. Using the two-liner configuration, once battery cells are inserted into their corresponding battery bays, the second liner can be easily removed to expose the first liner. Subsequent exposure of the first liner to UV light weakens the first adhesive, facilitating final removal for the first liner from the battery cells.

Weakening of the first adhesive bond strength can depend on a variety of factors, including: the first adhesive composition, light exposure wavelength, light exposure power, and light exposure time. In some aspects, the first adhesive may be reactive to light of a wavelength in the 300-400 nm range. In other aspects, the first adhesive may be reactive to light of a wavelength in the 350-375 nm range. By way of further example, the first adhesive may be reactive to light of a wavelength of approximately 365 nm. Additionally, in some aspects, exposure powers can vary from between 500-1000 mJ. For example, light exposure power may be between 700-800 mJ. In one embodiment, the exposure power may be approximately 720 mJ. Exposure times may also vary from between 2-10 seconds. In one embodiment, the first adhesive is exposed to UV light for 4 seconds.

Additional details regarding the battery back configuration, as well as a process for assembling a battery pack of the subject technology, are provided with respect to FIGS. 1-5, discussed below.

FIG. 1 illustrates a side view of an example battery pack 100. Battery pack 100 includes multiple battery cells 112, as well as multiple liners, i.e., a first liner 108, and a second liner 102. Second liner 102 further includes pads 104, that are positioned opposite from battery cells 112, with respect to first liner 108. Specifically, in the orientation illustrated in FIG. 1, battery cells 112 are bonded to a first surface 108A of first liner 108; pads 104 are positioned on a top side of first liner 108, i.e., on second surface 108B, opposite from battery cells 112. Although the example of FIG. 1 illustrates battery pack 100 as having three battery cells (e.g., 112A, 112B, and 112C), it is understood that battery pack 100 may have a greater (or fewer) number of cells, without departing from the scope of the technology.

Additionally, individual battery cells 112A, 112B, and 112C are illustrated as having a substantially similar height, each of the cells may have a different height, length and/or width. In some aspects, differences in height between cells may correspond with differences in the thickness of a corresponding pad 104. That is, a cell of a shorter relative height may be positioned opposite from a pad of a longer relative height, with respect to first liner 108. For example, the thickness of each individual pad can correspond with a thickness of the associated battery cell such that thicker battery cells are paired with thinner pads, and thinner (or shorter) battery cells are paired with thicker (or taller) pads. In some aspects, a total height for a given battery cell/pad pair is equal across all cell/pad pairings in the battery pack.

In battery pack 100, battery cells 112 are bonded to a first surface 108A, of first liner 108, e.g., by a first adhesive 106. First adhesive 106 is a UV reactive adhesive that provides a first adhesive force before exposure to UV light, and a second adhesive force after exposure to UV light. In some implementations, the second adhesive force is less than the first adhesive force, such that the adhesive bond of first adhesive 106 is weakened through UV light exposure. As such, UV light exposure can be used to aid removal of the first liner 108 from the pack assembly, as discussed in further detail below.

In the assembled configuration of battery pack 100, first liner 108 is blocked from UV light exposure through shielding provided by pads 104, which are coupled to second surface 108B of first liner 108, e.g., by second adhesive 110. Incident light can also be shielded from reaching first liner 108 through occlusion provided by second liner 102. That is, pads 104 and/or second liner 102 can block light, and particularly UV light, from reaching first liner 108, for example, to prevent a decrease in the adhesive strength of first adhesive 106.

In operation, battery pack 100 can be conveniently placed into a chassis of a receiving device, such that each of battery cells 112 are fitted into a respectively receiving battery bay (not illustrated). The second liner 102 and first liner 108 can then be stripped away, leaving battery cells 112 in their respective battery bay positions. By way of example, second liner 102 may be stripped from battery pack 100, breaking the adhesive bond between pads 104 and second surface 108B provided by second adhesive 110, e.g., which may comprise a medium tack adhesive. In such implementations, a third adhesive force provided by second adhesive 110, is less than the first adhesive force between first liner 108 and battery cells 112 provided by first adhesive 106. As such, removal of second liner 102 leaves a second surface 108B of first liner 108 exposed to incident light.

Subsequently, UV light can be provided onto first liner 108 to weaken the bonding force of first adhesive 106, i.e., to decrease the adhesive bond between battery cells 112 and second surface 108A from a first adhesive force (relatively strong) to a second adhesive force (relatively weak). In some aspects, first liner 108 is constructed of a material configured to pass UV light, for example, so that incident light on second surface 108B can reach first adhesive 106. That is, first liner 108 may be constructed of a transparent or translucent material.

By reducing the adhesive strength of first adhesive 106 (e.g., through UV light exposure), first liner 108 can be easily stripped away from battery cells 112, leaving the cells in their respective locations within a receiving chassis (not illustrated). By way of example, prior to UV light exposure, the first adhesive can provide a bond strength (first adhesive force) between the battery cells and a first surface of the first liner that is between 50-100 gf (gram force). In another example, the first adhesive can provide a first adhesive force between the battery cells and the first liner that is between 65-80 gf. In yet another example, the first adhesive can provide a first adhesive force of about 70 gf.

The first adhesive can be configured to significantly decrease in bond strength upon exposure to UV light, for example, that is in the range of about 355-370 nm. Once exposed, the first adhesive provides a second adhesive force that is significantly reduced from the first adhesive force. By way of example, the second adhesive force may be in the range of 5-15 gf. In another example, the second adhesive force may be in the range of 7-12 gf. In yet another example, the second adhesive force may be about 10 gf.

Figure 2A:
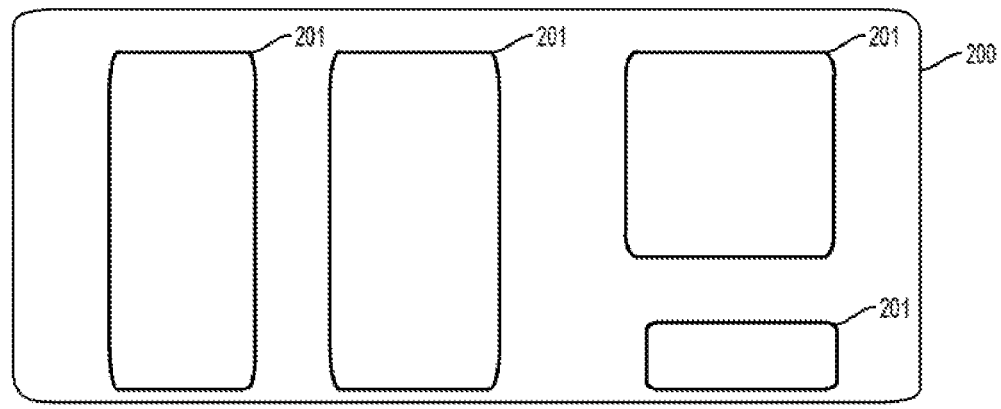
FIG. 2A illustrates a top-perspective view of a chassis for a battery-powered device, including multiple battery bays that are configured to receive battery cells, according to some aspects of the technology.

FIG. 2A illustrates a top-perspective view of an example chassis 200 for a battery-powered device, including multiple battery bays 201 configured to receive respective battery cells. Battery bays 201 can be regularly or irregularly spaced, and may be of different dimensions, for example, to accommodate different battery cell dimensions, depending on the desired implementation. Battery bays 201 can also have the same (or different) depth dimensions, e.g., to accommodate respective battery cells of a similar (or different) heights. Although chassis 200 depicted in FIG. 2A contains four battery bays 201, it is understood that chassis 200 may have a greater (or fewer) number of bays, without departing from the scope of the technology.

Figure 2B:
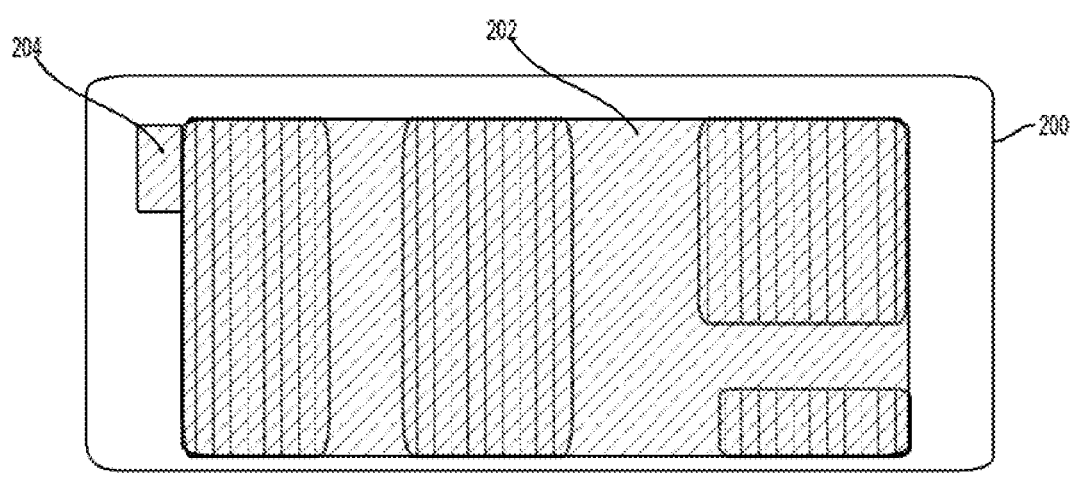
FIG. 2B illustrates a top-perspective view of a battery pack that has been placed in a chassis of a battery-powered device, according to some aspects of the technology.

FIG. 2B illustrates a top-perspective view of a battery pack 202 that has been placed in chassis 200. Battery pack 202 is shown from a top-perspective of a carrier liner e.g., second liner 102, discussed above with respect to FIG. 1. In the example of FIG. 2B, the carrier liner is illustrated as being semi-transparent, for example, to illustrate the underlying pads disposed above respective cells 112, in battery bays 201. However, it is understood that the carrier liner can be made of an opaque material to block light, depending on the desired implementation.

As further illustrated in FIG. 2B, battery pack 202 includes a tab 204 disposed on one edge of the carrier liner. Tab 204 can be configured to facilitate the convenient removal of the carrier liner. Carrier liner, e.g., a second liner 102, can be stripped away using tab 204, exposing a cosmetic liner, e.g., a first liner 108, disposed over cells 112 (also referring to FIG. 1). As discussed above, removal of the carrier liner can be accomplished without disturbing battery cells 212, because an adhesive, e.g., a second adhesive 110, that bonds the carrier liner/pad assembly to the cosmetic liner (first liner 108), has a lower adhesive force (e.g., a third adhesive force) than is provided by the UV adhesive, e.g., a first adhesive, between the battery cells and pads, prior to UV exposure.

Figure 2C:
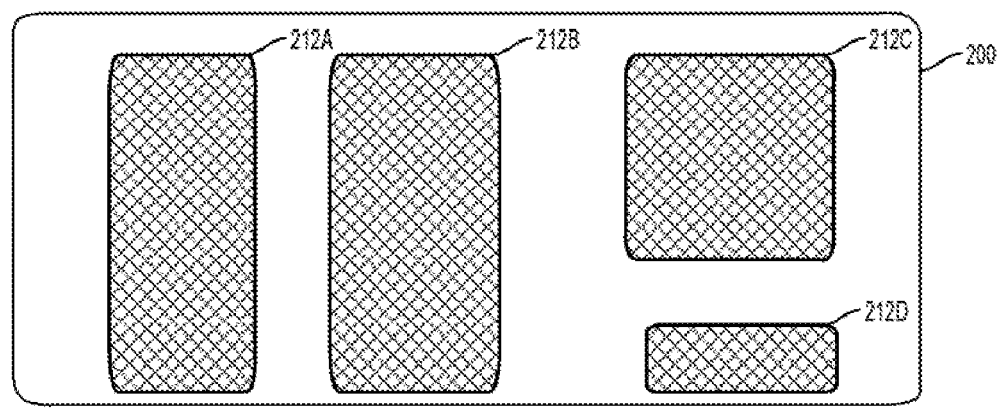
FIG. 2C illustrates a top-perspective view of a battery pack that is been placed in a chassis of a battery-powered device after removal of a top carrier liner and a cosmetic liner, according to some aspects of the technology.

FIG. 2C illustrates a top-perspective view of battery pack 202 that is been placed in a chassis after removal of a carrier liner (e.g., a second liner) and cosmetic liner (e.g., a first liner). As illustrated, battery cells 212 (e.g., individual cells 212A, 212B, 212C, and 212D) have different dimensions and relative spacing; however, it is understood that cell dimensions and spacing could be uniform, without departing from the scope of the technology.

Figure 3:
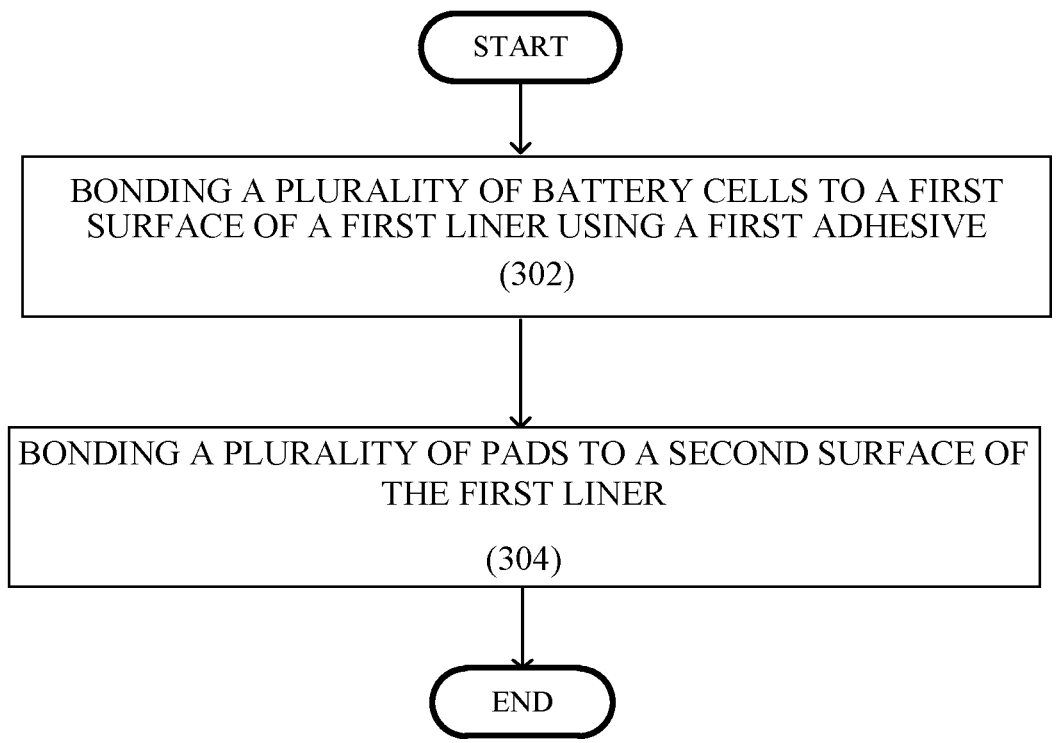
FIG. 3 illustrates an example process for manufacturing a battery pack, according to some aspects of the technology.

FIG. 3 illustrates an example process 300 for manufacturing a battery pack. Process 300 begins with step 302 in which one or more battery cells are bonded to a first surface of a first liner using a first adhesive. As discussed above, the first liner may be a transparent or translucent cosmetic liner configured to provide physical continuity between multiple battery cells, for example, to facilitate shipping and easy insertion into a device chassis.

The first adhesive can be a reactive adhesive configured to decrease in bond strength upon exposure to certain wavelengths of light, such as UV light. By way of example, prior to UV light exposure, the first adhesive can provide a bond strength (first adhesive force) between the battery cells and a first surface of the first liner that is between 50-100 gf (gram force). In another example, the first adhesive can provide a first adhesive force between the battery cells and the first liner that is between 65-80 gf. In yet another example, the first adhesive can provide a first adhesive force of about 70 gf.

The first adhesive can be configured to significantly decrease in bond strength upon exposure to UV light, for example, that is in the range of about 355-370 nm. Once exposed, the first adhesive provides a second adhesive force that is significantly reduced from the first adhesive force. The second adhesive force may be in the range of 5-15 gf. In another example, the second adhesive force may be in the range of 7-12 gf. In yet another example, the second adhesive force may be about 10 gf.

In step, 304 a plurality of pads are bonded to a second surface of the first liner, using a second adhesive. The second adhesive can be configured to provide a bond strength (e.g., of a third adhesive force) between the pads and the second surface of the first liner that is less than the first adhesive force.

As discussed above, the pads may be foam or another material that blocks UV light. As such, the pads help to maintain a bond between the cells and the first surface of the first liner by preventing degradation of the first adhesive caused by UV exposure.

Additionally, each pad can correspond with a battery cell that is bonded to an opposite side of the first liner. As discussed above, the thickness of each individual pad can correspond with a thickness of the associated battery cell such that thicker battery cells are paired with thinner pads, and thinner (or shorter) battery cells are paired with thicker (or taller) pads. In some aspects, a total height for a given battery cell/pad pair is equal across all cell/pad pairings in the battery pack.

Figure 4:
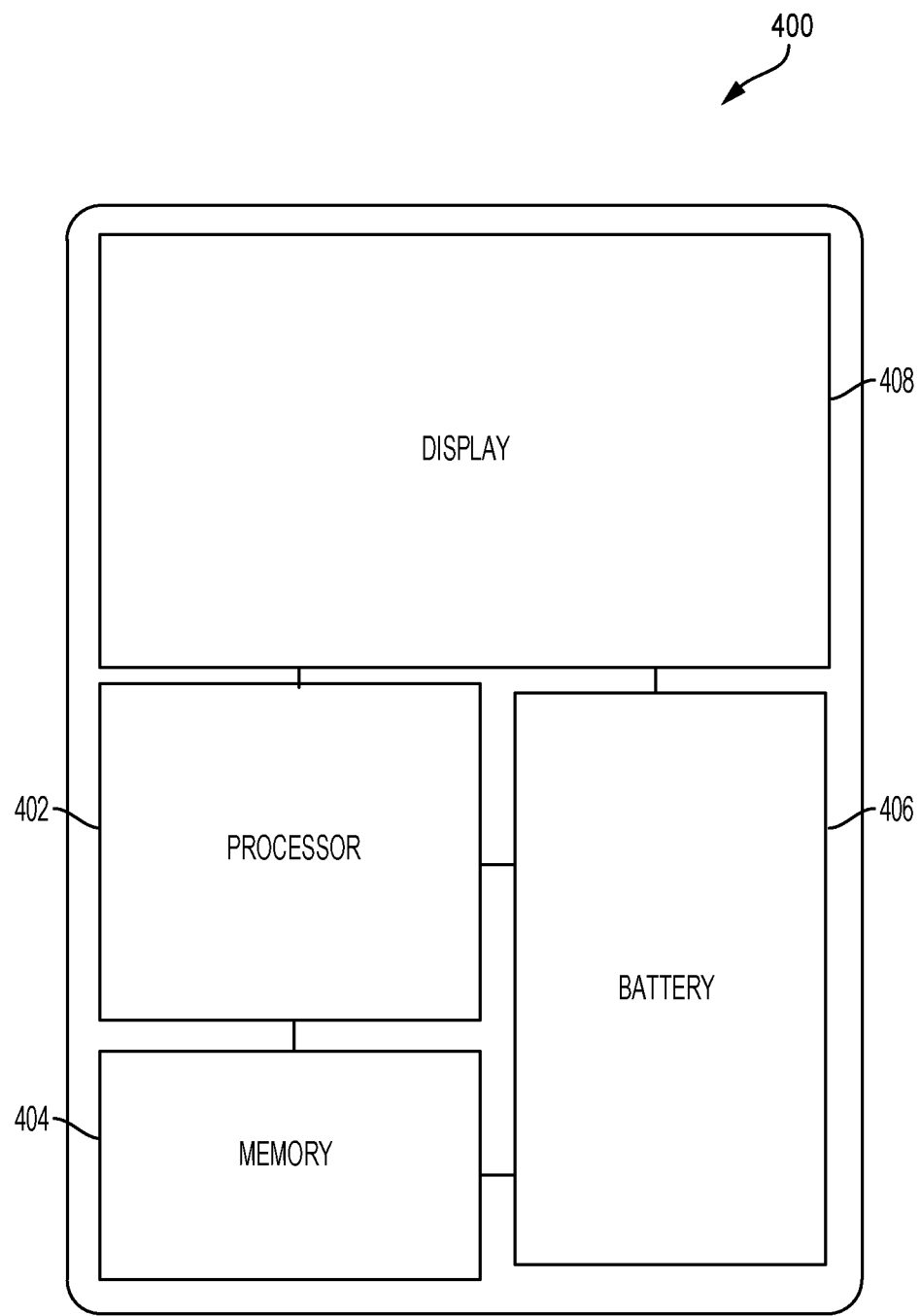
FIG. 4 illustrates a portable electronic device, in accordance with some aspects of the subject technology.

FIG. 4 illustrates a portable electronic device 400, including a battery pack 406, in accordance with various aspects of the described technology. Battery pack 406 can generally be used in any type of electronic device. For example, FIG. 4 illustrates a portable electronic device 400 that includes a processor 402, a memory 404 and a display 408, which are all powered by battery pack 406.

Electronic device 400 can correspond to a laptop computer, tablet computer, mobile phone, personal digital assistant (PDA), digital music player, watch, wearable device, and/or other type of battery-powered electronic device. Battery 406 may correspond to a battery pack that includes one or more battery cells, such as first and second prismatic cells, as discussed above.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A battery pack comprising:
   a plurality of battery cells, wherein each of the battery cells are bonded to a first surface of a first liner via a first adhesive,
      wherein the first adhesive is configured to provide a first adhesive force between each of the battery cells and the first surface before exposure to ultraviolet (UV) light and a second adhesive force after exposure to UV light, and wherein the second adhesive force is less than the first adhesive force; and
   a plurality of pads, wherein each of the pads is bonded to a second surface of the first liner via a second adhesive,
      wherein the second adhesive is configured to provide a third adhesive force between each of the pads and the second surface of the first liner, and wherein the third adhesive force is less than the first adhesive force.

2. The battery pack of claim 1, wherein each of the pads is coupled to a second liner.

3. The battery pack of claim 2, wherein the second liner blocks UV light.

4. The battery pack of claim 1, wherein each of the pads blocks UV light from reaching the first adhesive.

5. The battery pack of claim 1, wherein at least two of the plurality of pads have a different thickness.

6. The battery pack of claim 1, wherein at least two of the plurality of battery cells have a different thickness.

7. The battery pack of claim 1, wherein the first liner is translucent to UV light.

8. The battery pack of claim 1, wherein the first liner is transparent to UV light.

9. A battery pallet comprising a plurality of battery packs, wherein each battery pack comprises:
   a first liner;
   a plurality of battery cells bonded to a first surface of the first liner via a first adhesive,
      wherein the first adhesive is configured provide a first adhesive force between each of the battery cells and the first surface before exposure to ultraviolet (UV) light and a second adhesive force after exposure to UV light, and wherein the second adhesive force is less than the first adhesive force;
   a plurality of pads, wherein each of the pads is bonded to a second surface of the first liner via a second adhesive, and
      wherein the second adhesive is configured to provide a third adhesive force between each of the pads and the second surface of the first liner, and wherein the third adhesive force is less than the first adhesive force.

10. The battery pallet of claim 9, wherein each of the pads is coupled to a second liner.

11. The battery pallet of claim 10, wherein the second liner blocks UV light.

12. The battery pallet of claim 9, wherein each of the pads blocks UV light from reaching the first adhesive.

13. The battery pallet of claim 9, wherein at least two of the plurality of pads have a different thickness.

14. The battery pallet of claim 9, wherein at least two of the plurality of battery cells have a different thickness.

15. The battery pallet of claim 9, wherein the first liner is translucent to UV light.

16. The battery pack of claim 9, wherein the first liner is transparent to UV light.

17. A method of manufacturing a battery pack, comprising:
   bonding a plurality of battery cells to a first surface of a first liner using a first adhesive,
      wherein the first adhesive is configured to provide a first adhesive force between each of the battery cells and the first surface before exposure to ultraviolet (UV) light and a second adhesive force after exposure to UV light, and wherein the second adhesive force is less than the first adhesive force;
   bonding a plurality of pads to a second surface of the first liner, and
      wherein the second adhesive is configured to provide a third adhesive force between each of the pads and the second surface of the first liner, and wherein the third adhesive force is less than the first adhesive force.

* * * * *